(12) United States Patent
Zhou et al.

(10) Patent No.: US 9,160,390 B2
(45) Date of Patent: Oct. 13, 2015

(54) METHOD AND SYSTEM FOR IMPAIRMENT SHIFTING

(75) Inventors: Chengzhi Zhou, Orange, CA (US); Shuang Yu, Irvine, CA (US)

(73) Assignee: Maxlinear, Inc., Carlsbad, CA (US)

( * ) Notice: Subject to any disclaimer, the term of this patent is extended or adjusted under 35 U.S.C. 154(b) by 342 days.

(21) Appl. No.: 13/371,932

(22) Filed: Feb. 13, 2012

(65) Prior Publication Data

US 2013/0088647 A1    Apr. 11, 2013

Related U.S. Application Data

(60) Provisional application No. 61/544,922, filed on Oct. 7, 2011.

(51) Int. Cl.
| | |
|---|---|
| *H04N 5/50* | (2006.01) |
| *H04B 1/26* | (2006.01) |
| *H04L 25/06* | (2006.01) |
| *H04L 27/38* | (2006.01) |
| *H04B 1/30* | (2006.01) |
| *H04L 7/033* | (2006.01) |

(52) U.S. Cl.
CPC ............... *H04B 1/26* (2013.01); *H04L 25/061* (2013.01); *H04L 27/38* (2013.01); *H04N 5/50* (2013.01); *H04B 1/30* (2013.01); *H04L 7/033* (2013.01)

(58) Field of Classification Search
CPC ............. H04N 5/50; H04N 5/44; H04B 1/26; H04B 1/30; H04L 25/061; H04L 27/38; H04L 7/033
USPC .......... 348/731–732, 725–726, 607; 375/326, 375/327, 316; 455/255, 257–260, 182.2, 455/182.3, 180.3, 184.1
See application file for complete search history.

(56) References Cited

U.S. PATENT DOCUMENTS

| | | | | |
|---|---|---|---|---|
| 6,021,165 | A * | 2/2000 | Ohkubo et al. | 375/344 |
| 7,218,359 | B2 * | 5/2007 | Peng et al. | 348/731 |
| 7,239,357 | B2 * | 7/2007 | Jaffe | 348/726 |
| 8,548,091 | B2 * | 10/2013 | Row et al. | 375/296 |
| 8,559,525 | B2 * | 10/2013 | Reznic et al. | 375/240.26 |
| 2012/0281787 | A1 * | 11/2012 | Wang et al. | 375/316 |

* cited by examiner

*Primary Examiner* — Trang U Tran
(74) *Attorney, Agent, or Firm* — McAndrews, Held & Malloy (57) ABSTRACT

Methods and systems for impairment shifting may comprise receiving radio frequency (RF) signals in a receiver, down-converting the signals to baseband frequencies, and synchronizing the receiver to received signals. The frequency of a local oscillator (LO) may be adjusted to shift residual impairments to fall between desired baseband signals where they are least visible. The received RF signals may comprise analog, satellite, or cable, television signals. The LO frequency may be adjusted to configure the DC offset impairments to fall between luminance and chrominance harmonics. The LO frequency may be adjusted to configure I/Q imbalanced impairments from residual in-phase and quadrature mismatch of a picture carrier signal to fall about 300 kHz from a sound carrier signal in the analog television signals. The LO frequency may be adjusted to configure the I/Q imbalanced impairments from residual I/Q mismatch of a sound carrier signal to fall between luminance and chrominance harmonics.

23 Claims, 6 Drawing Sheets

METHOD AND SYSTEM FOR IMPAIRMENT SHIFTING

CROSS-REFERENCE TO RELATED APPLICATIONS/INCORPORATION BY REFERENCE

This application makes reference to and claims priority to U.S. Provisional Application Ser. No. 61/544,922 filed on Oct. 7, 2011, which is hereby incorporated herein by reference in its entirety.

FIELD OF THE INVENTION

Certain embodiments of the invention relate to wireless communication. More specifically, certain embodiments of the invention relate to a method and system for impairment shifting.

BACKGROUND OF THE INVENTION

Television providers have moved significantly toward cable and satellite technology for providing content to users, but terrestrial transmission still has significant usage worldwide. Analog television signals are still utilized in many areas of the world, and are also utilized in portions of digital provider networks.

Receivers introduce undesirable impairments to a signal when the signal is being amplified, filtered or downconverted. For example, direct conversion receivers (also referred to as "DCR", "zero IF receivers", or "ZIF receivers") are a very efficient way of implementing a radio receiver. However these receivers introduce a variety of impairments to a signal which can degrade overall performance of the system. Most notably, DC offset and signal image due to imbalances in the complex signal path, often referred to as "I/Q mismatch," may corrupt the downconverted signal. Existing methods for performing DC offset cancellation (DCOC) and I/Q calibration (IQ cal) can be effective at mitigating these problems. However, for signals which require very high signal to noise ratio such as analog TV signals, the residual impairment due to the limitations of these techniques can still leave visible artifacts in the analog picture screen.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for impairment shifting, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for impairment shifting. Exemplary aspects of the invention may comprise receiving one or more radio frequency (RF) signals in a receiver in a communication device, downconverting the received one or more received RF signals to baseband frequencies, and synchronizing the receiver to the one or more received RF signals. The frequency of one or more local oscillators in the receiver may be adjusted to shift a DC impairment signal to fall between desired baseband signals from the received RF signals. The one or more received RF signals may comprise analog television signals. The frequency of the one or more local oscillators may be adjusted to configure the DC offset impairments to fall between luminance and chrominance harmonics at baseband in the analog television signals. The frequency of the one or more local oscillators may be adjusted to configure an in-phase/quadrature (I/Q) imbalanced impairment caused by residual in-phase and quadrature mismatch of a picture carrier signal to fall near a sound carrier signal in the analog television signals. The frequency of the one or more local oscillators may be adjusted to configure an I/Q imbalanced impairment caused by residual in-phase and quadrature mismatch of a sound carrier signal to fall between luminance and chrominance harmonics at baseband in the analog television signals. In-phase and quadrature signals may be processed in the receiver. The one or more received RF signals may comprise satellite television signals or cable television signals. The receiver may comprise a direct conversion receiver.

Figure 1:
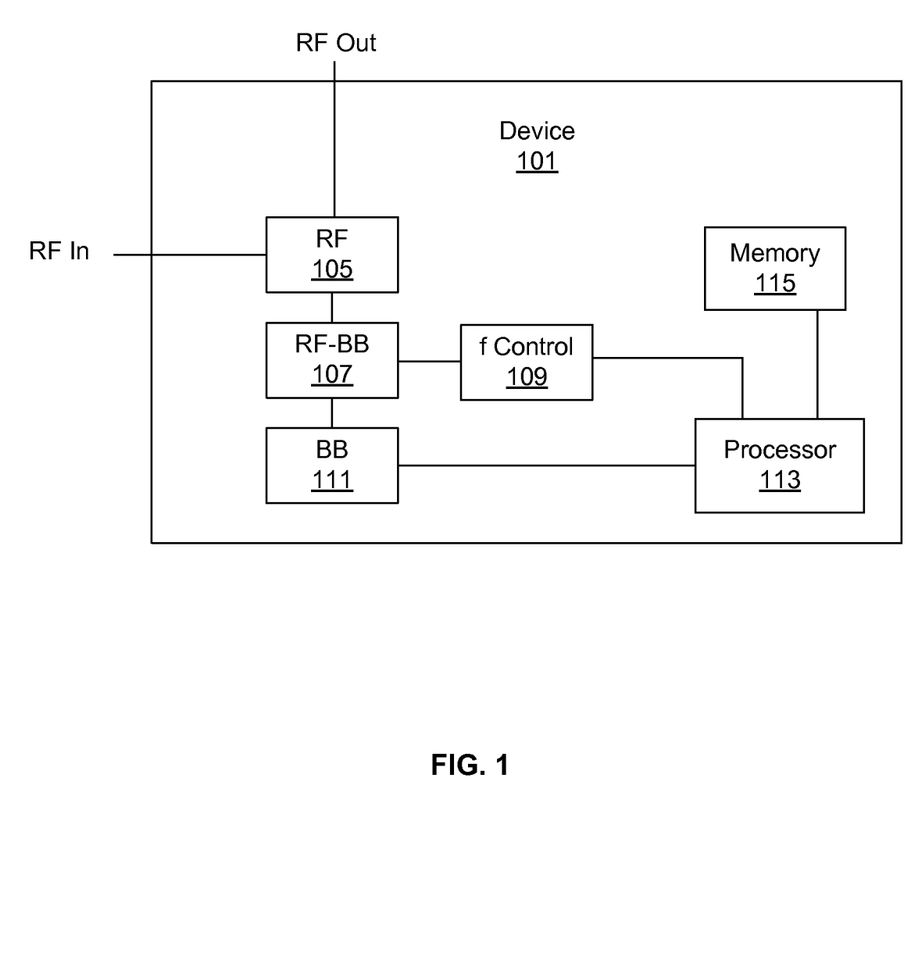
FIG. 1 is a diagram of an exemplary communication device with impairment shifting, in accordance with an embodiment of the invention.

FIG. 1 is a diagram of an exemplary communication device with impairment shifting, in accordance with an embodiment of the invention. Referring to FIG. 1, there is shown the receiving device 101 comprising a radio frequency (RF) module 105, an RF-to-baseband conversion module 107, a frequency control module 109, a baseband module 111, a processor 113, and a memory 115.

The RF module 105 may comprise one or more RF receive (Rx) and transmit (Tx) paths for receiving signals from a satellite system, cable TV head-end, and/or terrestrial TV antennas, for example. The RF module 105 may comprise impedance matching elements, LNAs, power amplifiers, variable gain amplifiers, and filters, for example. The RF module 105 may thus be operable to receive, amplify, and filter RF signals before communicating them to the RF-to-baseband module 107.

The RF-to-baseband module 107 may comprise mixers and local oscillators that may be operable to receive RF signals and down-convert them to baseband signals for further processing by the baseband module 111. The RF-to-baseband module 107 may comprise in-phase and quadrature mixers for use with polar signals, for example.

The local oscillators may be tunable such that a plurality of RF frequencies may be received and down-converted to baseband. In an exemplary embodiment, the local oscillators may be tuned to position impairments between desired signals to reduce the impairments effect on desired signals. The frequency of the local oscillators may be configured by the frequency control module 109.

The frequency control module 109 may comprise circuitry operable to control the frequency of the local oscillators, and may comprise crystal oscillators, frequency dividers, and an impairment shift calculation module for configuring the frequency of the local oscillators such that impairments fall between desired signals at baseband as opposed to interfering with the desired baseband signals.

The baseband module 111 may comprise circuitry operable to process received baseband signals. For example, the baseband module 111 may comprise filters and amplifiers for further processing of the selected baseband signals. In addition, the baseband module 111 may comprise one or more analog-to-digital converters (ADCs) to convert the received analog signals to digital signals for processing by the processor 113.

The processor 113 may comprise a general purpose processor, such as a reduced instruction set computing (RISC) processor, for example, that may be operable to control the functions of the wireless device 101. For example, the processor 113 may configure the frequency control module 109 to shift impairments between desired signals so as to reduce or eliminate interference. Additionally, the processor 113 may demodulate baseband signals received from the baseband module 111.

The memory 115 may comprise a programmable memory module that may be operable to store software and data, for example, for the operation of the wireless device 101. Furthermore, the memory 115 may store the frequency configurations performed by the frequency control module 109.

Receivers introduce undesirable impairments to a signal when the signal is being amplified, filtered or downconverted. For example, direct conversion receivers, which may also be referred to as "DCR", "zero IF receivers", or "ZIF receivers", are a very efficient way of implementing a radio receiver. However, they introduce a variety of impairments to a signal which can degrade overall performance of the system.

Most notably, DC offset and signal images due to imbalances in the complex signal path (often referred to as I/Q mismatch) may corrupt the downcoverted signal. Methods for performing DC offset cancellation and I/Q calibration may be effective at mitigating these problems. However, for signals which require very high signal to noise ratio, such as analog TV signals, the residual impairment due to the limitations of these techniques can still leave visible artifacts in the analog picture screen.

In a direct conversion receiver, the DC offset is introduced at the frequency to which the local oscillator is tuned. This can be due to self-mixing, circuit offset voltages/currents, or non-linearities, for example. The I/Q mismatch impairment may be introduced by the signal folding on itself about the local oscillator frequency. For the signals which require very high signal to noise ratio, such as analog TV signals, the residual impairments due to the limitations of DC offset cancellation or IQ imbalance calibrations may still interfere with picture or chroma carriers or their harmonics, and leave visible artifacts in the screen.

Furthermore, the limited frequency accuracy over individual crystals or crystal temperatures makes the actual local oscillator frequency unpredictable, which leads to unavoidable interferers of residual impairments and carrier harmonics. The device 101 may thus be operable to configure the local oscillator precisely via the frequency control module 109, and thereby control where these impairments fall within the received signal.

Figure 2:
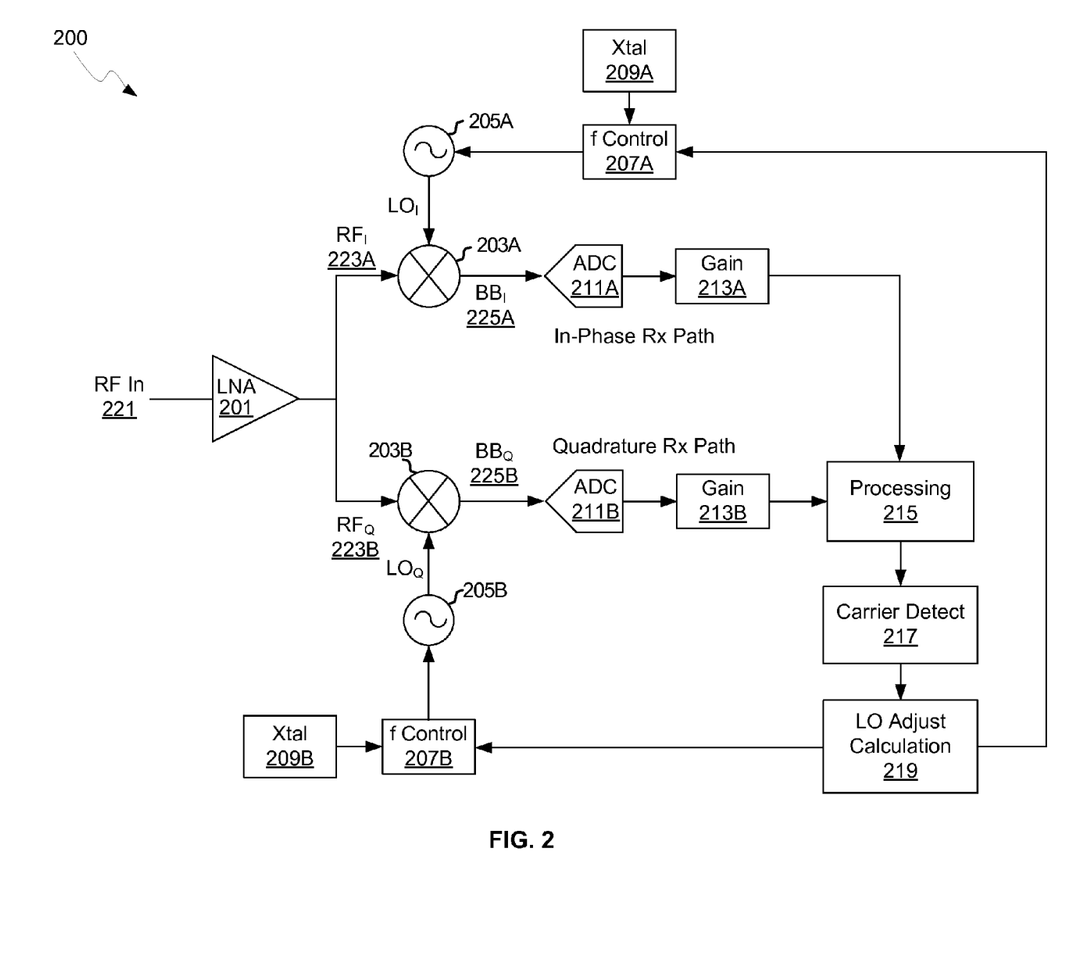
FIG. 2 is a diagram illustrating an exemplary receiver with impairment shifting, in accordance with an embodiment of the invention.

FIG. 2 is a diagram illustrating an exemplary receiver with impairment shifting, in accordance with an embodiment of the invention. Referring to FIG. 2, there is shown a receiver 200 comprising a low noise amplifier (LNA) 201, I and Q mixers 203A and 203B, local oscillators (LOs) 205A and 205B, frequency control modules 207A and 207B, crystal oscillators 209A and 209B, analog-to-digital converters (ADCs) 211A and 211B, gain blocks 213A and 213B, a processing module 215, a carrier detect module 217, and a local oscillator adjust calculation module 219. There are also shown an input RF signal RF In 221 and local oscillator signals LO_I and LO_Q.

The LNA 201 may be operable to provide amplification to the signal RF In 221 with the amplified signal being communicated to the mixers 203A and 203B. The signal RF In 221 may be down-converted to in-phase and quadrature signals in the I path and Q path in the receiver 200.

The mixers 203A and 203B may comprise circuitry that is operable to generate output signals at frequencies that are the sum and the difference between the input RF signal RF In 221 and the local oscillator signal, which comprises either $LO_I$ or $LO_Q$. The frequency of $LO_I$ and $LO_Q$ may be configured such that the desired signal is near zero frequency and other signals may be filtered out by a low pass filter, for example. The phase of the signals $LO_I$ and $LO_Q$ may be 90 degrees out of phase, thereby enabling the processing of in-phase and quadrature signals.

The local oscillators 205A and 205B may comprise circuitry that is operable to generate an RF signal to enable down-conversion of RF signals received by the mixers 203A and 203B, respectively. The local oscillators 205A and 205B may comprise voltage-controlled oscillators, for example, whose frequency of oscillation may be configured by a control voltage.

The frequency control modules 207A and 207B may comprise circuitry operable to generate a control signal for the local oscillators 205A and 205B. The frequency control modules 207A and 207B may comprise phase-locked-loops, frequency dividers and multipliers, filters, and other components for configuring the frequency of a local oscillator. The frequency control modules 207A and 207B may receive as an input, an adjustment signal from the LO adjust calculation module 219.

The frequency control modules 207A and 207B may also comprise phase offset capability for configuring LO signals 90 degrees out of phase for down-converting I and Q signals.

The crystal oscillators 209A and 209B may comprise stable clock sources for the receiver 200, and may comprise a piezoelectric crystal, for example, that outputs a stable clock signal at a given temperature. In another exemplary embodiment, the clock signals communicated to the frequency control modules 207A and 207B may be generated by a single crystal oscillator.

The ADCs 211A and 211B may comprise circuitry that is operable to convert analog input signals to digital output signals. Accordingly, the ADCs 211A and 211B may receive baseband analog signals from the mixers 203A and 203B and may generate digital signals to be communicated to the gain blocks 213A and 213B.

The gain blocks 213A and 213B may comprise digital gain modules for providing a programmable gain level to received digital signals prior to subsequent processing by the processing module 215.

The processing module 215 may comprise a processor similar to the processor 113, for example, described with respect to FIG. 1. Accordingly, the processing module 213 may be operable to control the functions of the receiver 200 and may process received baseband signals to demodulate, deinterlace, and/or perform other video processing techniques to the data.

The carrier detect module 217 may comprise circuitry for determining the location of impairments with respect to desired signals. Accordingly, the carrier detect module 217 may be operable to assess the relative amplitude of signals and their frequency to determine the location of the impairments. For example, the carrier detect module 217 may compare the amplitude of a signal at a frequency where a chroma, picture, or sound signal is expected based on the LO frequency utilized to down-convert the received signals to baseband. In an exemplary scenario, the carrier detect module 217 may comprise a separate module and in an alternate scenario, the carrier detect module 217 may comprise a part of the processing module 215.

The LO adjust calculation module 219 may comprise circuitry that is operable to determine an adjustment factor for tuning the local oscillators 205A and 205B, such that impairments are positioned between desired signals at baseband, as opposed to causing interference. The LO adjust calculation module 219 may receive, as an input, a signal from the carrier detect module 217 comprising an assessment of the frequency spectrum of the baseband signal generated by the down-conversion. Accordingly, the LO adjust calculation module 219 may determine that an impairment is interfering with a desired signal, and an output adjustment signal may be communicated to the frequency control modules 207A and 207B to result in the impairment falling between desired signals, where they are least visible.

Figure 3:
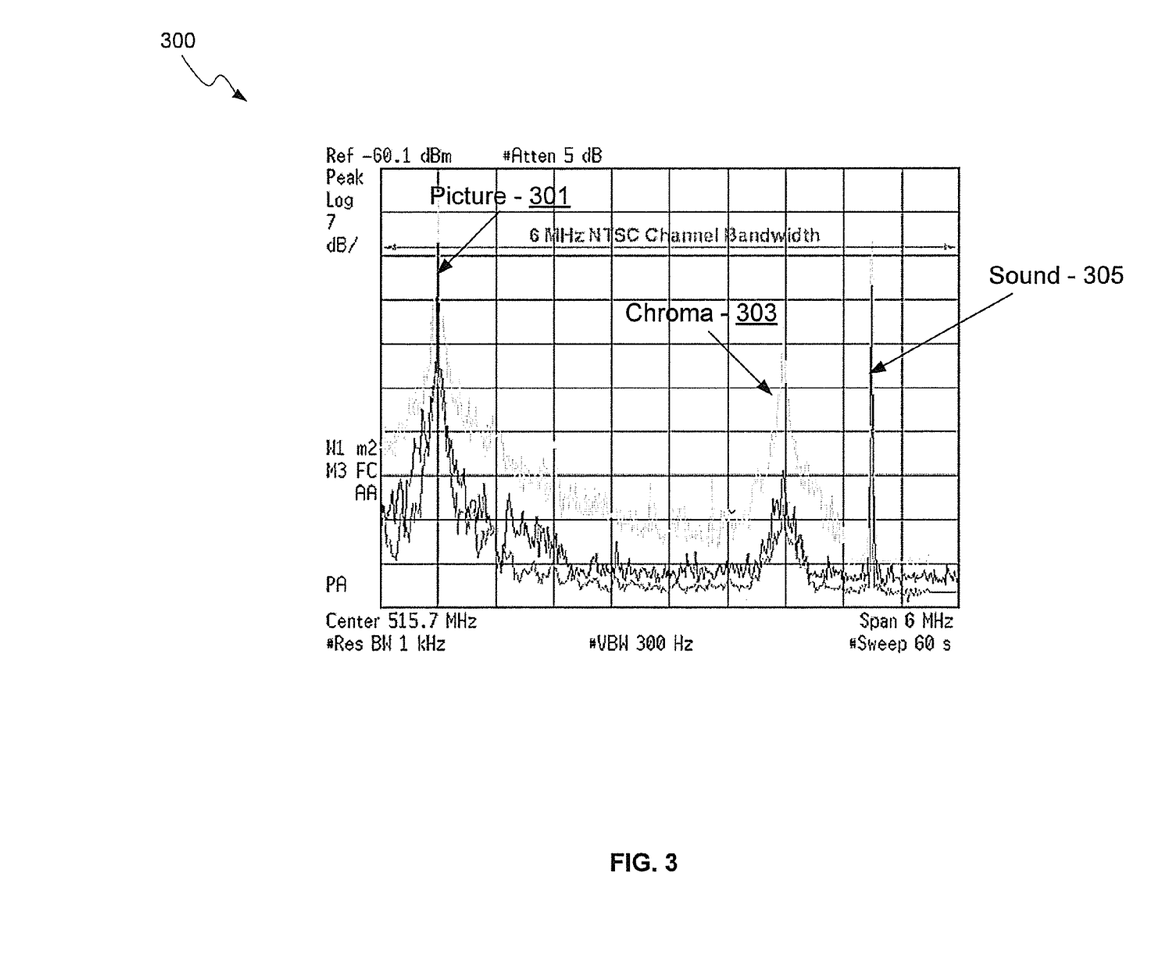
FIG. 3 is a diagram illustrating an exemplary analog television spectrum, in accordance with an embodiment of the invention.

FIG. 3 is a diagram illustrating an exemplary analog television spectrum, in accordance with an embodiment of the invention. Referring to FIG. 3, there is shown a television spectrum 300 comprising a picture signal 301, a chroma signal 303, and a sound signal 305. The signals may be down-converted to baseband by selecting a local oscillator signal at or near the desired frequency such that the resulting difference signal falls near zero frequency. DC offset due to self-mixing, circuit offset voltages or currents, and or nonlinearities may interfere with the down-converted desired signal. Existing methods for performing DC offset cancellation (DCOC) can effectively mitigate the DC problems. However, for signals which requires very high signal to noise ratio such as analog TV signal, the residual impairments due to the limitations of these techniques can still leave visible artifacts in the analog picture screen. The residual impairments may be further mitigated by tuning the local oscillator frequency so that the DC offset signal falls between desired signal spectra, as described further in FIG. 4.

Figure 4:
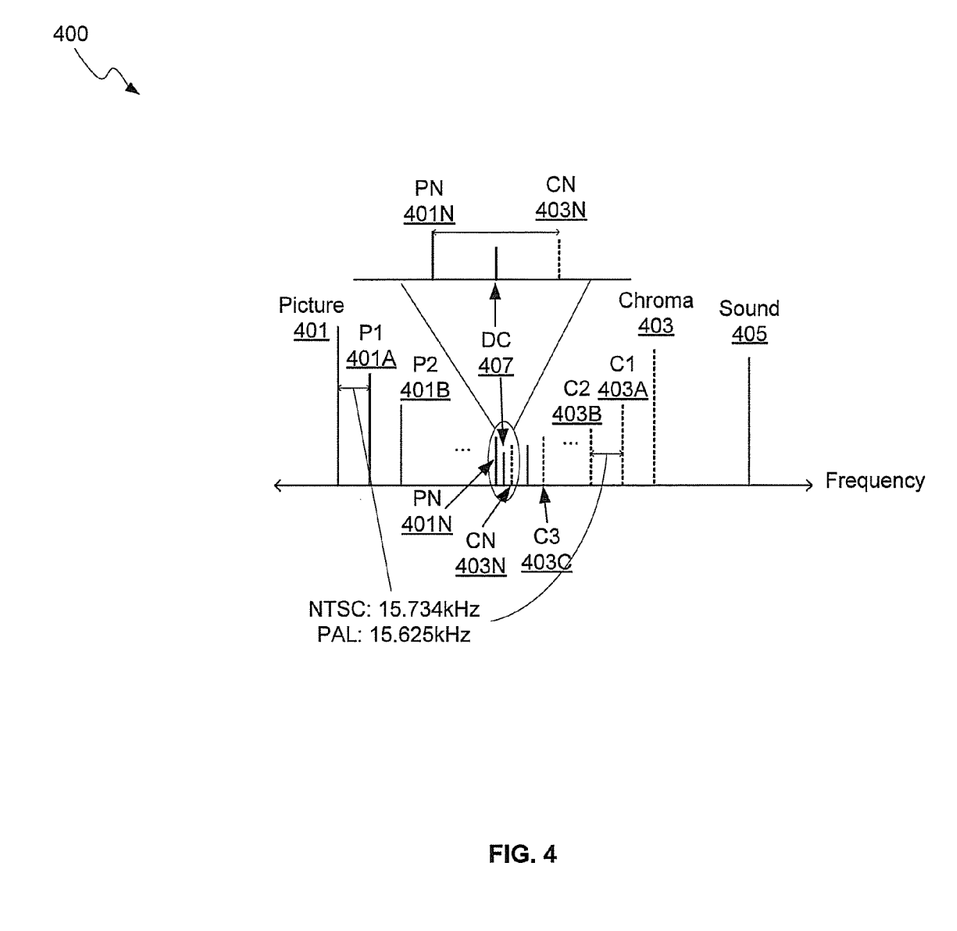
FIG. 4 is a diagram illustrating exemplary television spectra with a DC offset signal, in accordance with an embodiment of the invention.

FIG. 4 is a diagram illustrating an exemplary television spectrum with a DC offset signal, in accordance with an embodiment of the invention. Referring to FIG. 4, there is shown an analog television spectra 400 comprising picture signal 401 and associated harmonics P1-PN 401A-401N, a chroma signal 403 and associated harmonics C1-CN 403A-403N, a sound signal 405, and a DC offset signal 407. Analog TV signals comprise picture and chroma carriers which are modulated to produce harmonic multiples of the modulation rate. For NTSC the harmonic spacing is 15.734 kHz; for PAL it is 15.625 kHz.

In an exemplary scenario, the DC offset impairment may be mitigated by: (1) down-converting the signal with a direct conversion receiver, such as the receiver 200, so that the desired signal overlaps with DC; (2) synchronizing to the received signal so that the receiver 200 may determine precisely where the impairment will occur within the received signal; (3) adjusting the local oscillator of the receiver to shift the DC offset so that it falls in between desired features in the signal.

The synchronizing to a received signal may utilize phase lock loops, carrier recovery loops, or data recovery loops, for example. For analog TV signals, the DC offset may be positioned to fall somewhere between the picture and chroma harmonics, as shown by the DC offset signal 407. In an exemplary scenario, the DC offset signal 407 may be located half way between the picture harmonic PN 401N and the chroma harmonic CN 403N, as illustrated in FIG. 4.

Figure 5:
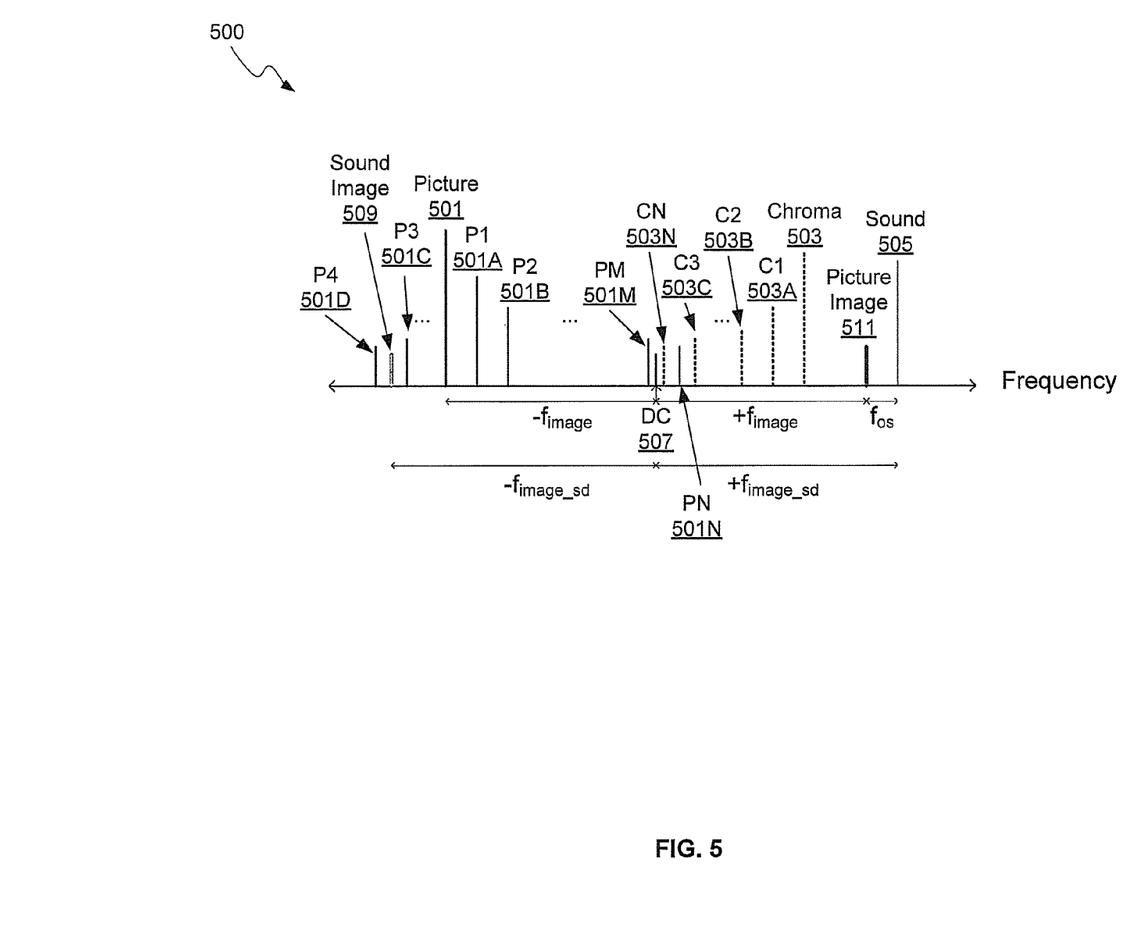
FIG. 5 is a diagram illustrating an exemplary television spectrum with image signals, in accordance with an embodiment of the invention.

FIG. 5 is a diagram illustrating an exemplary television spectrum with image impairments due to I/Q path imbalance, in accordance with an embodiment of the invention. Referring to FIG. 5, there is shown an analog television spectra 500 comprising picture carrier signal 501 and associated harmonics P1-PN 501A-501N, a chroma carrier signal 503 and associated harmonics C1-CN 503A-503N, a sound signal 505, a DC offset signal 507, a sound image signal 509, and a picture image signal 511.

The I/Q path imbalance may due to inaccurate 90 degree phase difference between $LO_I$ 205A and $LO_Q$ 205B, or asymmetric path gain (or loss) in the analog baseband I/Q paths between the mixer 225 and the ADC 211 in FIG. 2. Existing methods for performing I/Q calibration (IQ cal) can effectively mitigate the image problems. However, for signals which require very high signal to noise ratio such as analog TV signals, the residual impairments due to the limitations of these techniques can still leave visible artifacts in the analog picture screen.

The frequency spacing between the image impairment 511 and the DC offset signal 507 is indicated by $+f_{image}$ and the spacing between the picture carrier signal 501 and the DC offset signal 507 is indicated by $-f_{image}$. Similarly, the frequency spacing between the sound signal 505 and the DC offset signal 507 is indicated by $+f_{image\_sd}$ and the spacing between the sound image impairment 509 and the DC offset signal 507 is indicated by $-f_{image\_sd}$.

Since there are many carrier harmonics for the picture carrier signal 501 and the chroma carrier signal 503, the receiver local oscillator may be flexibly configured in order to choose between which harmonics the DC offset falls. By changing the harmonic with respect to the DC offset, the image frequency $f_{image}$ changes.

The image impairments may be mitigated by: (1) adjusting the LO frequency such that the image of the picture carrier falls close to the sound carrier, this invention shifts the image outside of the desired video bandwidth including Picture and Chroma signals and their harmonics; and (2) adjusting the LO frequency such that the separation of the sound carrier signal 505 from the picture image 511, $f_{OS}$, is larger than the sound carrier's modulated bandwidth, which avoids interference with the sound signal. In an exemplary embodiment, the picture image is positioned about 300 KHz away from the sound carrier. This reduces the impact that I/Q mismatch has on the quality of the video signal, since the picture carrier signal 501 is generally the strongest component in the video signal. Similarly, the sound image signal 509 may be configured to fall between the picture harmonics P1-PN 501A-501N, as shown between P3 501C and P4 501D in FIG. 5, which may minimize the impact that I/Q mismatch has from sound carriers, to the quality of the video signal.

Relative to picture center carrier 501, as the LO frequency in the receiver is adjusted, the DC offset signal 507 location may shift the same amount as the LO frequency, while the picture image signal 511 and the sound carrier image signal 509 move twice as much, which enables the above positioning criteria to be met.

Figure 6:
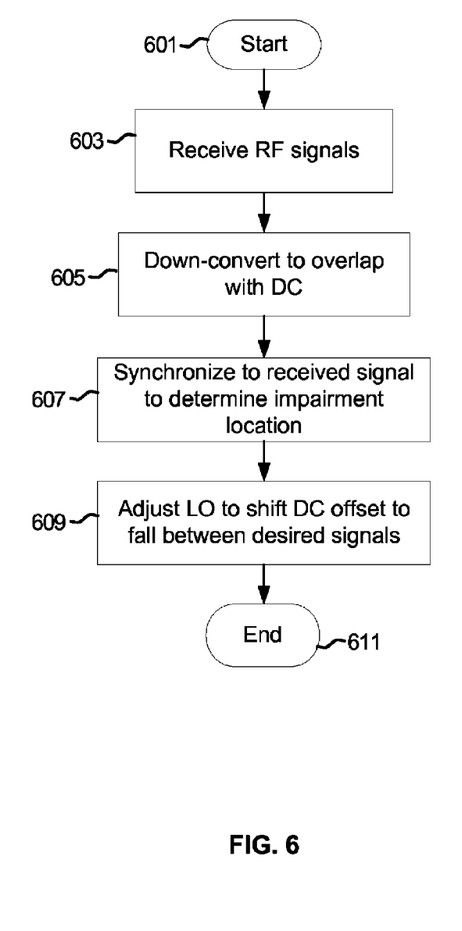
FIG. 6 is a block diagram illustrating exemplary steps for impairment shifting in accordance with an embodiment of the invention.

FIG. 6 is a block diagram illustrating exemplary steps for impairment shifting in accordance with an embodiment of the invention. The exemplary method illustrated in FIG. 6 may, for example, share any or all functional aspects discussed previously with regard to FIGS. 1-5.

Referring to FIG. 6, after start step 601, in step 603, RF input signals may be received by the RF front end receiver 105 of the device 101. The RF input signals may be communicated from a cable television or satellite television service provider or from terrestrial television signals.

In step 605, the signals may be down-converted to baseband using one or more mixers. In an exemplary scenario, two mixers with 90 degree offset clock signals (LO_I and LO_Q) may generate in-phase and quadrature baseband signals in each Rx path. The wireless device may comprise a plurality of Rx paths.

In step 607, the receiver may be synchronized to the received signal so that it may determine precisely where the impairment will occur within the received signal. The synchronizing may be accomplished via phase-locked loops, carrier recovery loops, or data recovery loops, for example.

In step 609, the receiver local oscillator may be adjusted to shift the DC offset position so that it falls between desired features in the signal. For example, in analog television signals, the DC offset may be configured between the picture and chroma harmonics, and in an exemplary scenario may be configured to fall halfway between the picture and chroma harmonics to reduce or eliminate interference with desired signals. This is followed by end step 611.

In an embodiment of the invention, a method and system may comprise receiving one or more radio frequency (RF) signals 221, 300 in a receiver 200 in a communication device 101, downconverting the received one or more received RF signals 221, 300 to baseband frequencies, and synchronizing the receiver 200 to the one or more received RF signals 221, 300.

The frequency of one or more local oscillators 205A and 205B in the receiver 200 may be adjusted to shift a DC impairment 407, 507 to fall between desired baseband signals 401, 403, 405, 501, 503, 505 from the received RF signals 221, 300, 400, 500. The one or more received RF signals 221, 300 may comprise analog television signals 300.

The frequency of the one or more local oscillators 205A and 205B may be adjusted to configure a DC impairment 407, 507 to fall between luminance and chrominance harmonics 401A-401N, 403A-403N, 501A-501N, and 503A-503N at baseband in the analog television signals 300. The frequency of the one or more local oscillators 205A and 205B may be adjusted to configure an I/Q imbalanced impairment 511 caused by residual in-phase and quadrature mismatch of a picture carrier signal 401, 501 to fall near a sound carrier signal 405, 505 in the analog television signals 300.

The frequency of the one or more local oscillators 205A and 205B may be adjusted to configure an I/Q imbalanced impairment 509 caused by residual in-phase and quadrature mismatch of a sound carrier signal 405, 505 to fall between luminance and chrominance harmonics 401A-401N, 403A-403N, 501A-501N, and 503A-503N at baseband in the analog television signals 300. In-phase and quadrature signals 223A, 223B, 225A, and 225B may be processed in the receiver 200. The one or more received RF signals 221, 300 may comprise satellite television signals or cable television signals. The receiver 200 may comprise a direct conversion receiver.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for impairment shifting.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communication, the method comprising:
in a communication device:
receiving one or more radio frequency (RF) analog television signals in a receiver of said communication device;
downconverting said received one or more received RF analog television signals to baseband frequencies;
synchronizing said receiver to said one or more received RF analog television signals; and
adjusting a frequency of one or more local oscillators in said receiver to shift impairments to fall where they are least visible, said adjusting comprising configuring in-phase/quadrature (I/Q) imbalanced impairments caused by residual in-phase and quadrature mismatch of a picture carrier signal to fall near a sound carrier signal in said received RF analog television signals.

2. The method according to claim 1, comprising adjusting said frequency of said one or more local oscillators to configure a DC offset impairment to fall between luminance and chrominance harmonics at baseband in said analog television signals.

3. The method according to claim 1, comprising configuring said I/O imbalanced impairments with about 300 kHz separation from said sound carrier signal.

4. The method according to claim 1, comprising adjusting said frequency of said one or more local oscillators to configure said I/O imbalanced impairments caused by residual in-phase and quadrature mismatch of a sound carrier signal to fall between luminance and chrominance harmonics at baseband in said analog television signals.

5. The method according to claim 1, comprising processing in-phase and quadrature signals in said receiver.

6. The method according to claim 1, wherein said one or more received RF analog television signals comprise satellite television signals.

7. The method according to claim 1, wherein said one or more received RF analog television signals comprise cable television signals.

8. The method according to claim 1, wherein said receiver is a direct conversion receiver.

9. A system for communication, the system comprising:
one or more circuits for use in a communication device, said one or more circuits being operable to:
receive one or more radio frequency (RF) analog television signals in a receiver of said communication device;
downconvert said received one or more received RF analog television signals to baseband frequencies;
synchronize said receiver to said one or more received RF analog television signals; and
adjust a frequency of one or more local oscillators in said receiver to shift impairments to fall where they are least visible, said adjusting comprising configuring in-phase/quadrature imbalanced impairments caused by residual in-phase and quadrature mismatch of a picture carrier signal to fall near a sound carrier signal in said received RF analog television signals.

10. The system according to claim 9, wherein said one or more circuits are operable to adjust said frequency of said one or more local oscillators to configure a DC offset impairment to fall between luminance and chrominance harmonics at baseband in said analog television signals.

11. The system according to claim 9, wherein said one or more circuits are operable to configure said I/O imbalanced impairment with about 300 kHz separation from said sound carrier signal.

12. The system according to claim 9, wherein said one or more circuits are operable to adjust said frequency of said one or more local oscillators to configure said I/O imbalanced impairments caused by residual in-phase and quadrature mismatch of a sound carrier signal to fall between luminance and chrominance harmonics at baseband in said analog television signals.

13. The system according to claim 9, wherein said one or more circuits are operable to process in-phase and quadrature signals in said receiver.

14. The system according to claim 9, wherein said one or more received RF analog television signals comprise satellite television signals.

15. The system according to claim 9, wherein said one or more received RF analog television signals comprise cable television signals.

16. A system for communication, the system comprising:
one or more circuits for use in a communication device, said one or more circuits being operable to:
receive one or more radio frequency (RF) analog television signals in a receiver of said communication device;
downconvert said received one or more received RF analog television signals to baseband frequencies;
synchronize said receiver to said one or more received RF analog television signals; and
adjust a frequency of one or more local oscillators in said receiver to shift impairments to fall where they are least visible, said adjusting comprising configuring a DC offset impairment to fall between luminance and chrominance harmonics signals at baseband in said received analog television RF signals.

17. The system according to claim 16, wherein said one or more circuits are operable to process in-phase and quadrature signals in said receiver.

18. The system according to claim 16, wherein said one or more received RF analog television signals comprise satellite television signals.

19. The system according to claim 16, wherein said one or more received RF analog television signals comprise cable television signals.

20. A method for communication, the method comprising:
in a communication device:
receiving one or more radio frequency (RF) analog television signals in a receiver of said communication device;
downconverting said received one or more received RF analog television signals to baseband frequencies;
synchronizing said receiver to said one or more received RF analog television signals; and
adjusting a frequency of one or more local oscillators in said receiver to shift impairments to fall where they are least visible, said adjusting comprising configuring a DC offset impairment to fall between luminance and chrominance harmonics at baseband in said received RF analog television signals.

21. The method according to claim 20, comprising processing in-phase and quadrature signals in said receiver.

22. The method according to claim 20, wherein said one or more received RF analog television signals comprise satellite television signals.

23. The method according to claim 20, wherein said one or more received RF analog television signals comprise cable television signals.

\* \* \* \* \*